United States Patent Office 3,440,005
Patented Apr. 22, 1969

3,440,005
PROCESS FOR REMOVING CHROMIUM AND SILICON VALUES FROM ALUMINATE SOLUTIONS
Richard Henry Featherston and Silas Edward Carroll, Benton, Ark., assignors to Reynolds Metals Company, Richmond, Va., a corporation of Delaware
No Drawing. Continuation of application Ser. No. 465,782, June 21, 1965. This application Apr. 3, 1968, Ser. No. 718,637
Int. Cl. C01g 7/00; C01f 11/00
U.S. Cl. 23—52
6 Claims

ABSTRACT OF THE DISCLOSURE

Black sand, a ferruginous alkali insoluble bauxite digestion residue, is used to treat an aqueous alkaline slurry obtained by the digestion of an aluminous ore with caustic alkali solution to remove disolved chromium and silicon therefrom by precipitation thereof as insoluble compounds in the black sand, followed by separation of the insoluble chromium and silicon compounds and the black sand from the digestion liquor.

---

This application is a continuation of S.N. 465,782, filed June 21, 1965 and now abandoned.

This invention relates to a novel method for the removaly of chromium and silicon from alkali metal aluminate solutions. More particularly, the invention concerns the removal of chromium and silicon from Bayor process liquors by precipitation with black sand, a ferruginous by-product of bauxite processing.

The novel method of the invention is adapted to the processing of chromium-containing aluminous ores, and particularly ores of the bauxite type. The term bauxite is generally used to designate a natural aggregate of aluminum-bearing minerals, more or les impure, in which the aluminum occurs largely as hydrated oxides.

The most commonly used method for extracting alumina from bauxite is the Bayor process. In accordance with this process, the ground bauxite is digested with an aqueous solution of an alkali, such as, for example, caustic sodia, or with a mixture of caustic soda and sodium carbonate. There is obtained a slurry which comprises a suspension of the constituents of the bauxite other than alumina and which are insoluble in the alkali liquor. The liquor contains the alumina dissolved in the form of a supersaturated sodium aluminate solution. The constituents of the bauxite which remain unattacked during the alkali digestion form an insoluble residue. A portion of this insoluble residue is coarse and heavy, representing a part of the bauxite which is considerably harder than the bulk of the mineral, is generally low in alumina, and is generally high in iron content, and is black in color. It is readily separated by coarse classification, and constitutes a waste product, known as black sand. This material is fully described in Bureau of Mines Report of Investigations 4621, published January 1050, by W. A. Calhoun, entitled "Titanium and Iron Minerals from Black Sands in Bauxite."

Another type of alkali insoluble ore residue, known as red mud, is also present, and is separated from the sodium aluminate solution or Bayor liquor by filtration or sedimentation or a combination of both. The clarified liquor comprises an unstable solution of alumina from which part of the disolved alumina is precipitated by seeding with alumina hydrate. The precipitated alumina hydrate is then separated from the liquor by sedimentation and filtration, washed and calcined at high temperature to form alumina.

Purity specifications for alumina, and particularly alumina of ceramic grade, limit the chromic oxide ($Cr_2O_3$) content to 10 parts per million or less. Concentrations of chromium in excess of this limit impart a pink color to the fused ceramic product, which is unacceptable. In order to meet this specification, it is necessary for the Bayor liquor from which the alumina is produced to have a maximum chromium content of no more than 1.8 parts per million, or 0.0022 gram per kilogram.

Carribean bauxite ores have come into increased use by the American aluminum industry, among which are Jamaican bauxites which are relatively high in chromium. Owing to the solubility of chromium oxide in caustic alkalis, a substantial portion of this chromium, and of silica present as well, is dissolved with the alumina and appears in the Bayer process liquors, to a level which may be of the order of 3 to 12 parts per million. The chromium in the trivalent state precipitates with the alumina trihydrate during Bayer precipitation, although hexavalent chromium does not do so. Much of the chromium in the Bayer liquor thus passes through to the alumina. Calcined alumina obtained from such liquors may contain as much as 35 parts per million of chromic oxide ($Cr_2O_3$) which is far beyond the specification limits.

In accordance with the present invention it has been found, susprisingly and unexpectedly, that by the addition of black sand to the unclarified alkali slurry of bauxite prior to or during digestion, a considerable reduction occurs in the amounts of chromium and silicon dissolved during digestion. The nature of the action of the black sand upon the chromium and silicon present is not fully understood at the present time, but it is known that if black sands are present during the digestion of chromium-containing aluminous ore, a significant portion of the chromium and silicon compounds from the aluminous ore which would otherwise be dissolved in the sodium aluminate liquor during digestion, will be precipitated so that they can be readily removed from the sodium aluminate liquor, together with the black sand, during the clarification step which follows digestion.

Thus, for example, in accordance with the novel method of the invention, black sands from the processing of bauxite, such as Arkansas bauxite, are slurried with alkali liquor and the slurry is pumped to the rod mill where the aluminous ore is added. After grinding, the slurry is digested, and then passed through clarification equipment, where the solid residue of black sand with attached chromium and silicon compounds, is discharged. In subsequent processing the sodium aluminate liquor thus obtained precipitates alumina hydrate which contains less chromium and silicon compounds owing to the black sand treatment.

The black sand may be advantageously added to the aluminous ore to be extracted in a proportion ranging from about 5% to about 20% by weight. As mentioned previously, the black sand is ferruginous in character, and appears to act as a collector for the chromium and silicon compounds of the ore. The general composition of black sands from Arkansas and South American bauxites is shown in the following table:

TABLE 1.—COMPOSITION OF BLACK SAND
[Unit: grams per 100 grams]

| Component | Average | Range | |
|---|---|---|---|
| | | High | Low |
| Iron on $Fe_2O$ basis | 42.41 | 49.60 | 34.16 |
| $TiO_2$ | 3.39 | 6.50 | 2.30 |
| $Al_2O_3$ | 17.41 | 20.20 | 15.20 |
| $Na_2O$ | 3.54 | 5.86 | 2.63 |
| $SiO_2$ | 12.93 | 18.79 | 9.63 |
| $CaO$ | 2.74 | 3.50 | 1.52 |
| F | 0.09 | 0.12 | 0.06 |
| $SO_3$ | 0.67 | 1.15 | 0.60 |

The proportion of black sand to aluminous ore required to reduce chromium and silicon to a minimum will depend upon the composition of the black sand and of the ore. Insufficient addition of black sand limits chromium and silicon removal. Excess addition of black sand reduces retention time of the bauxite in the digesters, and increases processing costs.

The effectiveness of the black sand as a collector for chromium and silicon compounds is shown by the following data. Table 2 shows the reduction in chromic oxide $Cr_2O_3$ content of alkaline liquor after digestion. The liquor was prepared by digesting 10 grams of Jamaican bauxite in 100 ml. of alkaline liquor which contained 0.0034 g./kg. $Cr_2O_3$, giving a slurry containing 0.0042 g./kg. $Cr_2O_3$.

TABLE 2.—EFFECT OF BLACK SAND IN $Cr_3O$ REDUCTION.

| Grams black sand | 0 | 0.10 | 0.50 | 1.00 | 2.00 |
|---|---|---|---|---|---|
| G./kg. $Cr_2O_3$ | 0.0042 | 0.0038 | 0.0022 | 0.0021 | 0.0018 |
| Ratio black sand to bauxite | 0 | 0.01 | 0.05 | 0.10 | 0.20 |

By the addition of the black sand to the digester liquor, in accordance with the invention, it has been found that the silica contamination of the digester discharge liquor can be reduced by 15% to 25%.

The following example illustrates the practice of the invention, but is not to be regarded as limiting:

Example

A 10,000 lb. lot of Jamaican bauxite containing 0.04% $Cr_2O_3$ by weight was made into a slurry with a caustic soda solution having a concentration of 116 g./kg. $Na_2O$ and 0.0034 g./kg. $Cr_2O_3$. The resulting slurry contained 0.0042 g./kg. of $Cr_2O_3$. A slurry of black sand from the processing of Arkansas bauxite was prepared in alkali liquor and pumped to a rod mill where the Jamaican bauxite slurry was added and the mixture ground for 5 to 7 minutes. The mixture was then digested at 290° F. for 50–60 minutes. The slurry was treated in conventional clarification equipment. The black sand underflow after separation may be discarded or may be recycled. The clarified liquor was treated with starch and settled, and further processed in accordance with conventional procedure to form calcined alumina.

The amount of black sand added was 5% by weight of the bauxite, resulting in a reduction in the level of $Cr_2O_3$ content to 0.0022 g./kg. in the liquor after digestion instead of the 0.0042 g./kg. which would have resulted if the black sand had not been added. The silica content was reduced from 0.65 g./kg. to 0.50 g./kg. The percentage of $Cr_2O_3$ in the calcined alumina was reduced from 0.00356 for alumina from untreated digester liquor, to a level of 0.00032, or well within the permissible limit of 10 parts per million.

We claim:

1. Method for the removal of dissolved chromium and silicon from an aqueous alkaline slurry obtained by the digestion of a chromium-containing Jamaican bauxite ore with caustic alkali, said slurry containing alkali insoluble ore residue, comprising the steps of adding to said slurry prior to or during the digestion from about 5% to about 20% by weight of said aluminous ore of the black sand fraction of alkali insoluble digestion residue derived from a ferruginous bauxite, to precipitate said chromium and silicon as insoluble compounds on said black sand, and separating the insoluble compounds and black sand from the digestion liquor.

2. The method of claim 1 in which the black sand is derived from Arkansas bauxite.

3. Method for the removal of dissolved chromium from an aqueous alkaline slurry obtained by the digestion of a chromium-containing aluminous ore with caustic alkali, said slurry containing alkali insoluble ore residue, comprising the steps of adding to said slurry prior to or during the digestion from about 5% to about 20% by weight of said aluminous ore of the black sand fraction of ferruginous alkali insoluble digestion residue derived from Arkansas bauxite, to precipitate said chromium as an insoluble compound on said black sand, and then separating the insoluble compound and the black sand from the digestion liquor.

4. The method of claim 3 in which the aluminous ore is Jamaican bauxite.

5. Method for reducing the chromium and silica contamination of calcined alumina produced by the Bayer process, comprising the steps of forming an aqueous alkaline slurry of Jamaican bauxite ore containing chromium and silicon, adding to said slurry from about 5% to about 20% by weight of said ore of the black sand fraction of ferruginous alkali insoluble digestion residue derived from Arkansas bauxite, digesting said ore and black sand slurry at elevated temperature to form an aqueous alkaline slurry of alkali metal aluminate solution and black sand having precipitated thereon insoluble chromium and silicon compounds, separating said black sand, settling the resulting clarified liquor, precipitating alumina hydrate therefrom, and calcining said alumina hydrate to form calcined alumina.

6. The method of claim 5 in which said elevated temperature for digestion is about 290° F.

References Cited

UNITED STATES PATENTS

| 1,137,860 | 5/1915 | Howard | 23—52 |
| 2,926,069 | 2/1960 | Perrin et al. | 23—52 |
| 3,295,924 | 1/1967 | Colombo | 23—143 |
| 3,311,449 | 3/1967 | Atsukawa et al. | 23—143 X |

HERBERT T. CARTER, *Primary Examiner.*

U.S. Cl. X.R.

23—143